United States Patent [19]
Doerfer et al.

[11] 3,739,903
[45] June 19, 1973

[54] APPARATUS FOR DIVERTING ARTICLES FROM A PATH OF TRAVEL

[75] Inventors: Richard F. Doerfer, Waterloo; Homer N. Leymaster, Cedar Falls; Richard R. Neebel, Waterloo, all of Iowa

[73] Assignee: Doerfer Corporation, Cedar Falls, Iowa

[22] Filed: Sept. 9, 1971

[21] Appl. No.: 178,915

[52] U.S. Cl. .................................. 198/35, 198/66
[51] Int. Cl. ............................................ B65g 59/02
[58] Field of Search ................ 198/21, 24, 35, 66, 198/185, 26, 85

[56] References Cited
UNITED STATES PATENTS
3,198,308  8/1965  Driesch ............................... 198/24
2,846,098  8/1958  Kopp ................................ 198/85 X

*Primary Examiner*—Edward A. Sroka
*Attorney*—James V. Callahen and Molinare, Allegretti

[57] ABSTRACT

Apparatus for diverting severed articles, such as spare ribs, carried on top of another article, such as a hog carcass. A conveyor belt carries the hog carcass along a path of travel with previously severed spare ribs resting thereon. A diverting device is positioned laterally of the spare ribs as the conveyor continuously carries the spare ribs and the hog carcass along their path of travel. An air cylinder is operatively connected to the diverting device. A limit switch detects when the leading edge of the hog carcass and spare ribs are in such a position that the diverting apparatus is opposite the spare ribs, and then activates the air cylinder to move the diverting means to engage and transversely divert the spare ribs from the conveyor and from the hog carcass. Preferably, a holding device bears down on the fat back portion to hold the entire hog carcass, including the belly and fat back portions, from lateral movement on the conveyor during the diversion of the spare ribs therefrom. Means are also provided for receiving the ejected spare ribs.

13 Claims, 7 Drawing Figures

Inventors:
Richard E. Doerfer
Homer N. Leymaster
Richard R. Neebel

By Molinare, Allegretti,
Newitt & Witcoff
Attys.

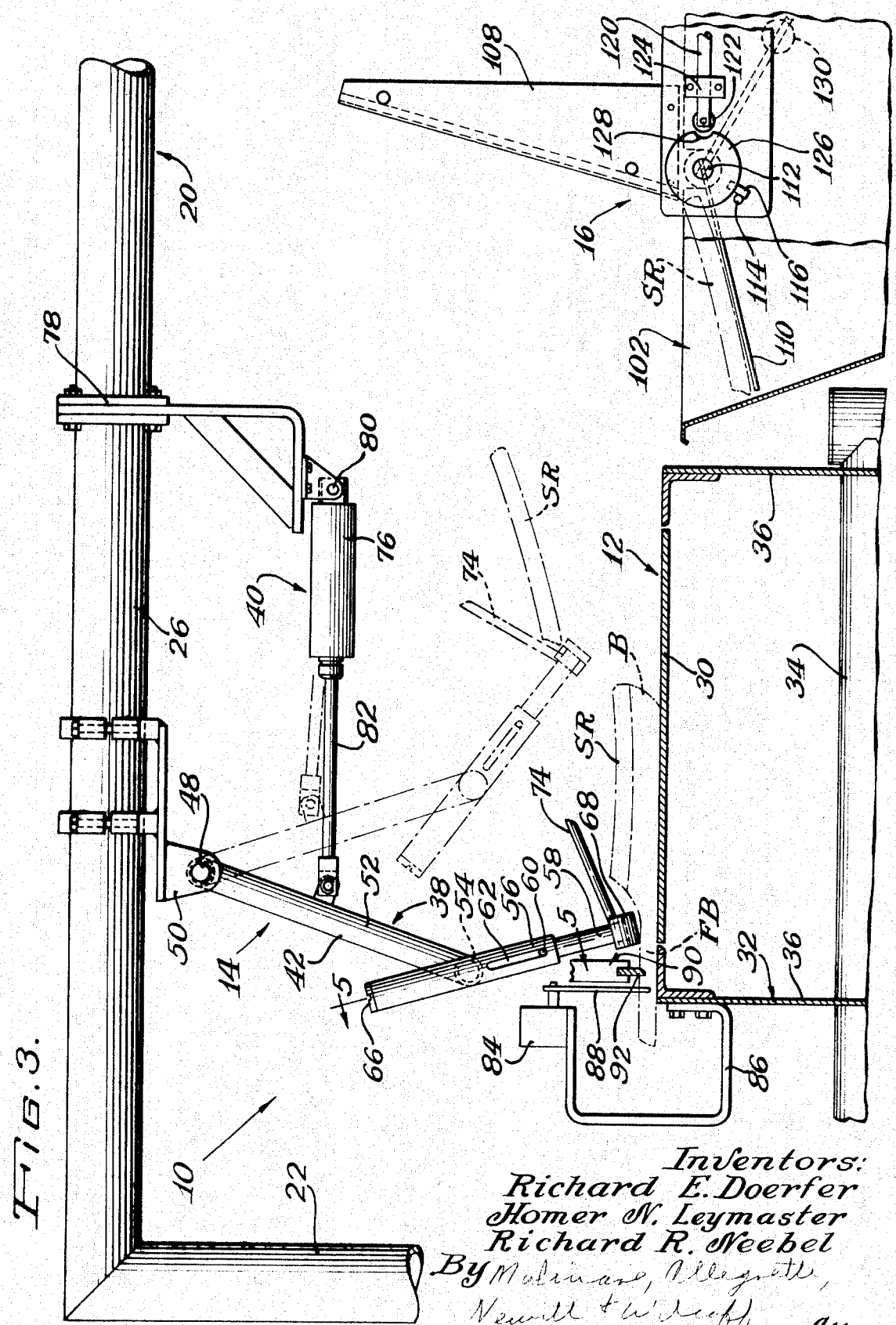

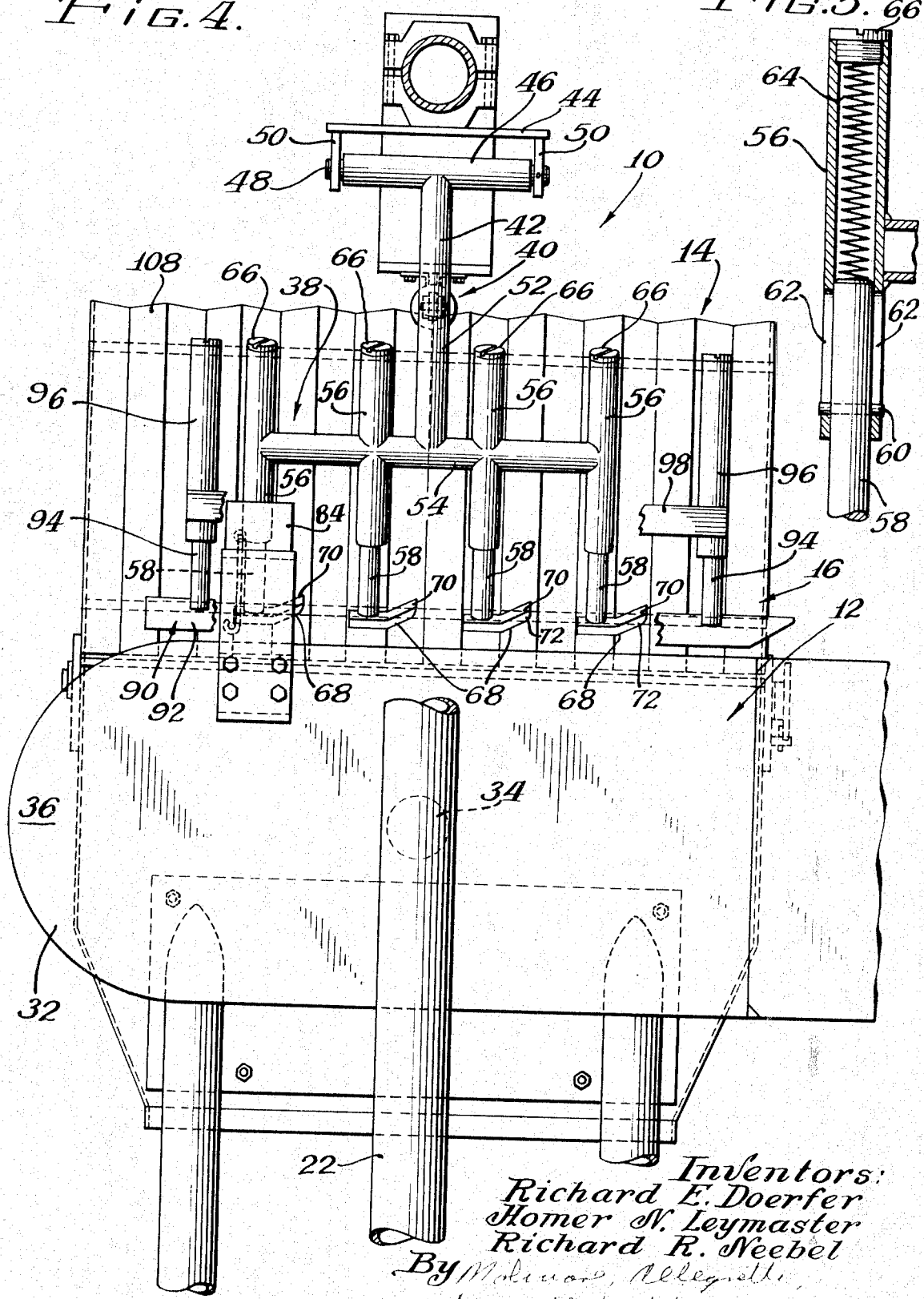

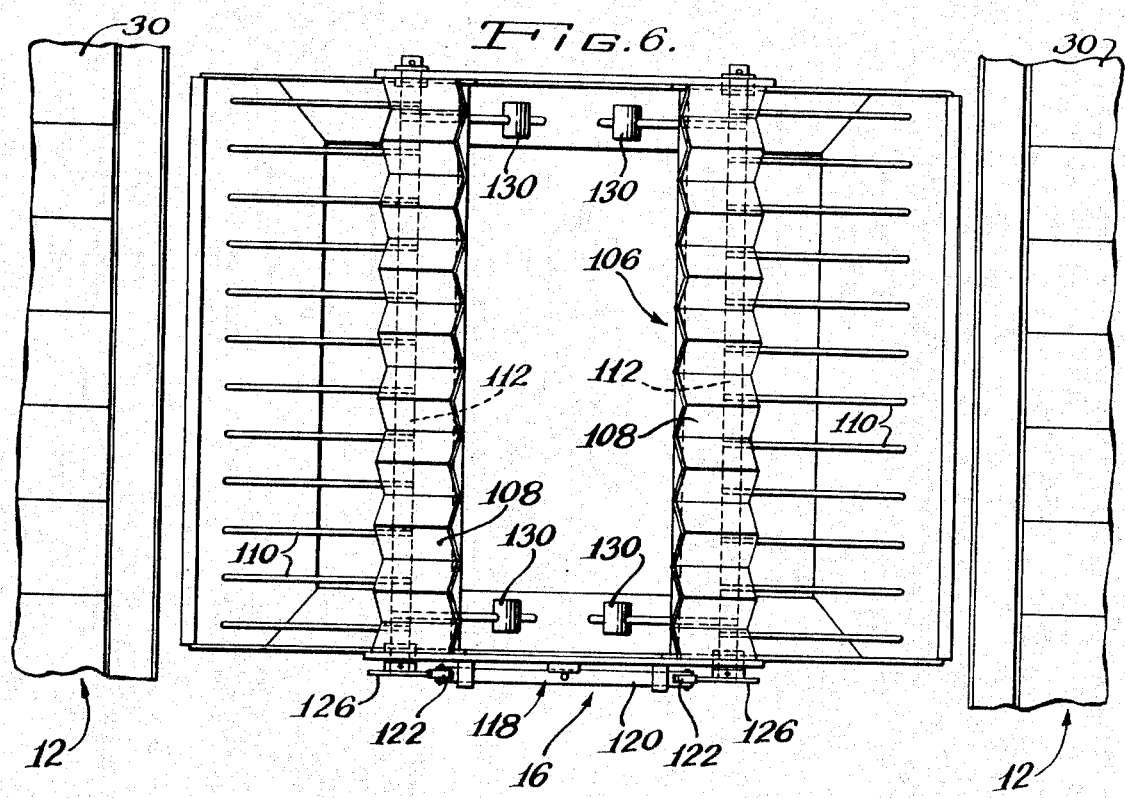
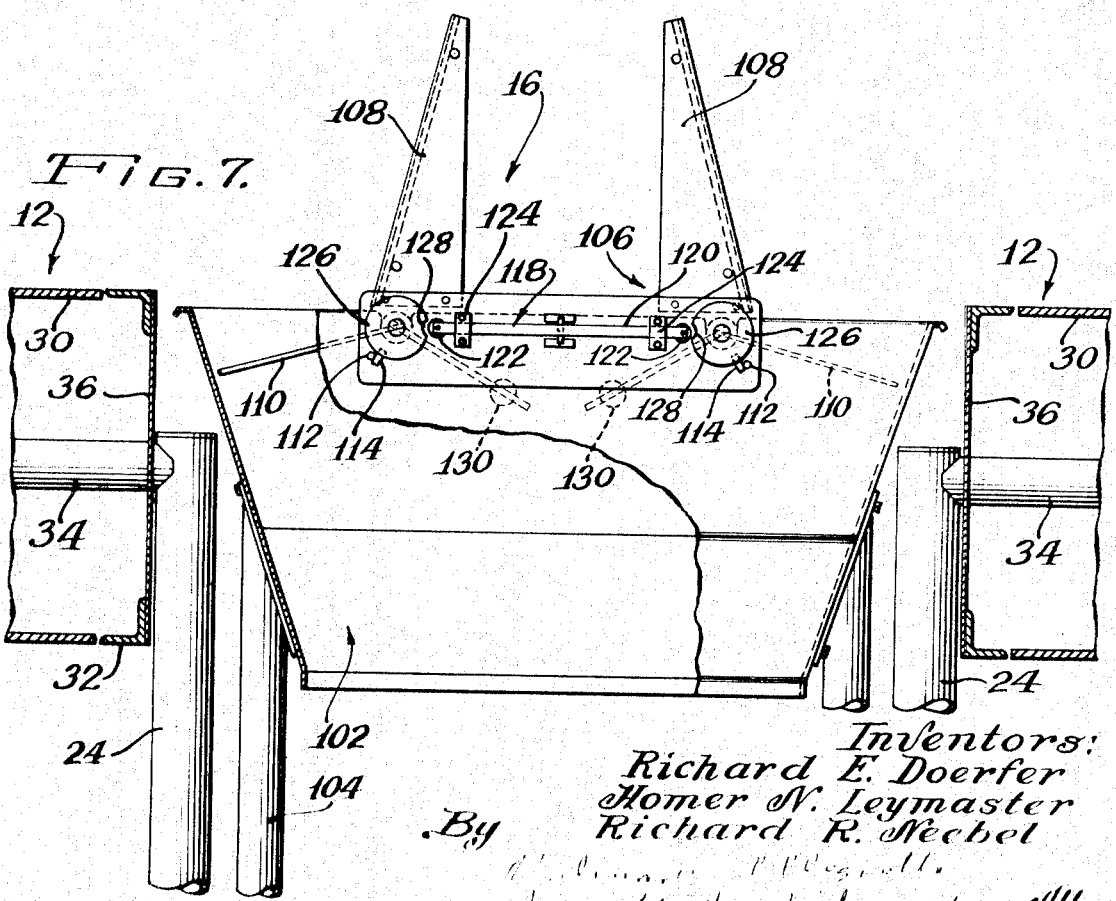

APPARATUS FOR DIVERTING ARTICLES FROM A PATH OF TRAVEL

BACKGROUND OF THE INVENTION

1. Field of the Invention

This invention relates to an apparatus for diverting articles from a path of travel and it particularly relates to apparatus for diverting or ejecting spare ribs after they have been severed from the belly portions of hog carcasses and remain in a rest position thereon.

2. Description of the Prior Art

Apparatus is known wherein pork or hog sides are automatically butchered. One such device is shown in Vogt et al. U.S. Pat. No. 3,159,869. Also, Neebel et al. U.S. Pat. No. 3,546,737 illustrates a loin pulling and rib cutting machine.

With respect particularly to the apparatus shown in U.S. Pat. No. 3,546,737, following the removal or pulling of the ribs from the pork belly, no provision is made therein for automatically ejecting or removing the severed spare ribs from a rest position on top of the belly portion of the hog carcass. This patent disclosed only that an operator could be located at the discharge end of the machine to lift the ribs from the remaining portion of the hog side and then the ribs could be placed on a separate conveyor or in a container.

From the standpoint of economy, it would clearly be highly desirable to provide equipment for diverting or ejecting the severed spare ribs from the hog side. However, such equipment must satisfy many requirements. Various types of ejectors or diverting equipment are known for moving or diverting articles from a path of travel. Ejection equipment needed for discharging severed spare ribs from hog carcasses and from the conveyors carrying the carcasses must overcome unique problems.

One of these problems involves the discharge of the spare rib without adversely effecting or materially moving the hog side which continues in its preselected path of travel on a moving conveyor for further processing. For example, the fat back portion of the hog side is normally severed from the belly portion, the belly normally being used for making bacon. A circular saw or the like may be used for this purpose. Thus, a saw could conveniently be mounted downstream of the unsevered fat back and belly. However, it would be important, for automatic operation, that the hog belly remain in a fixed transverse position on the conveyor in order for the severing mechanism to sever the belly from the fat back at the proper separation position therebetween. Thus, if the unsevered belly and fat back is moved transversely, during rib ejection, it may adversely affect the downstream processing. If too much fat back is left on the belly, the belly is downgraded and is less valuable. On the other hand, if too much of the belly portion remains with the fat back, the valuable belly portion, used for bacon, is less valuable because the price per pound of the fat back is significantly less than the price per pound of the belly.

Such ejecting equipment must also be economically manufactured and effective in use because, otherwise, it would not be economically justified. Also, any significant movement of the carcass during ejection not only could have an adverse affect on later processing, but the moved carcass could move into a position which could jam the equipment.

SUMMARY OF THE INVENTION

It is therefore an important object of this invention to provide an apparatus for ejecting a plurality of substantially flat articles resting on top of other articles, as both the articles are being carried along a preselected path of travel.

It is also an object of this invention to provide apparatus useful for ejecting successive spare ribs continuously moving along a path of travel and resting on an unsevered belly portion of a hog carcass.

It is still another object of this invention to provide spare rib ejecting apparatus wherein the spare ribs are ejected from the upper side of a hog carcass without moving the hog carcass laterally in the same direction as the spare ribs.

It is still a further object of this invention to provide a unique spare rib ejecting apparatus, wherein the apparatus is particularly characterized by its simplicity and economy of construction, manufacture and operation.

It is also another object of this invention to provide a spare rib ejecting apparatus, wherein the ejecting apparatus strikes the lateral edge of the spare ribs only, while lateral movement of the hog carcass is prevented but longitudinal movement thereof is permitted during carriage by the moving conveyor.

Further purposes and objects of this invention will appear as the specification proceeds.

The foregoing objects are accomplished by providing a spare rib diverting apparatus, also useful for other articles, wherein the spare ribs are each detachably resting on the unsevered belly and fat back portions of hog carcasses, a conveyor continuously moves both the carcasses and the severed spare ribs along a path of travel, a diverting device for the spare ribs is located transversely of the moving spare ribs, drive means are provided for operating the diverting means, means are provided for activating the drive means only when the articles are positioned substantially opposite the spare ribs and, preferably, a holding device holds the hog carcass from moving laterally on the conveyor while the spare ribs are being diverted transversely from each carcass and from the conveyor and while the carcass is permitted to continue its longitudinal movement.

BRIEF DESCRIPTION OF THE DRAWINGS

One particular embodiment of the present invention is illustrated in the accompanying drawings wherein:

FIG. 3 is an enlarged detailed end view of the diverting mechanism for the spare ribs;

FIG. 4 is a detailed side elevational view of the embodiment of the diverting mechanism shown in FIG. 3;

FIG. 5 is an enlarged sectional view taken along the line 5—5 of FIG. 3;

FIG. 6 is a fragmentary top plan view of the embodiment of FIG. 2, showing the apparatus used for receiving the ejected spare ribs; and FIG. 7 is an end elevational view of the embodiment of FIG. 6.

DETAILED DESCRIPTION OF THE PREFERRED EMBODIMENT

Figure 1:
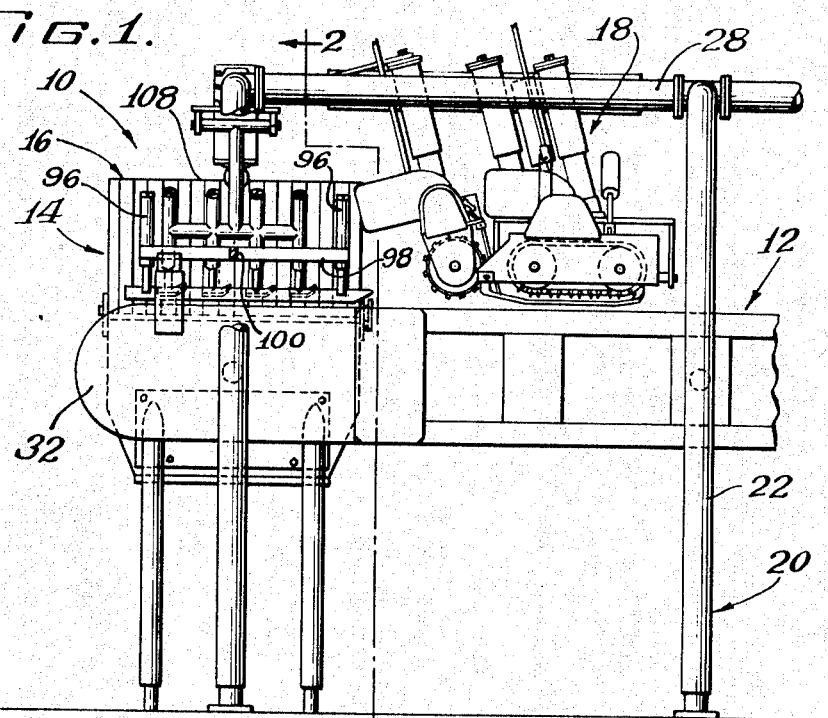
FIG. 1 is a side elevational view of one embodiment of our apparatus useful for diverting or ejecting spare ribs from hog carcasses immediately following the pulling or severing of the spare ribs from the belly portion of the carcasses.
Figure 2:
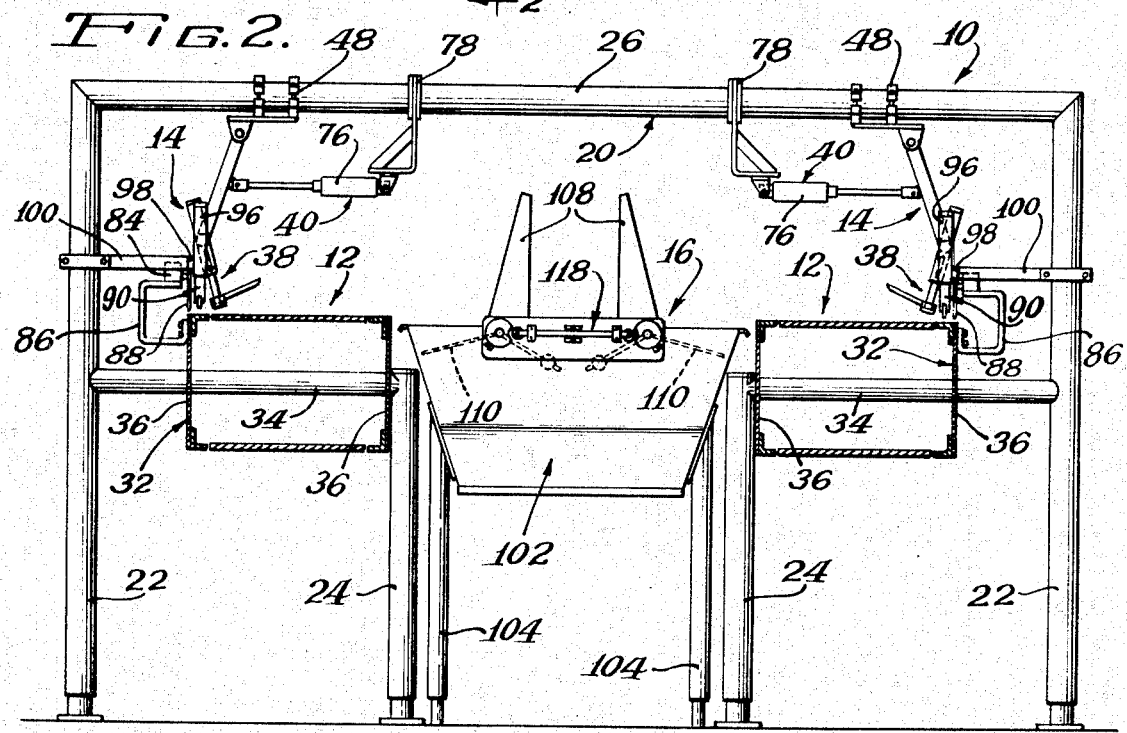
FIG. 2 is an end elevational view of the embodiment of FIG. 1.

Referring particularly to FIGS. 1 and 2, our rib ejecting or diverting apparatus, generally 10, includes a conveyor section, generally 12, a diverting or ejecting section, generally 14, and a receiving section, generally 16. As shown in FIG. 2, two conveyor sections 12 and two diverting sections 14 are used in combination with a single rib receiving section 16. The conveyor section 12 and the diverting section 14 are substantially mirror images of each other. The purpose of having two conveyor sections 12 and two diverting sections 14 is that this permits simultaneous operation on left half and right half sections of a hog carcass. Since the conveyor and diverting sections 12 and 14 are mirror images of each other, the description of those sections hereafter will describe only one ejecting apparatus and conveyor section, as shown in FIGS. 3 and 4. It is to be understood, of course, that the other of the pair of diverting sections 14 and conveyor sections 12 are constructed precisely the same, in the mirror image of the other. It is to be further understood that the described rib ejecting apparatus 10 may also be used in connection with the ejection or diverting of other articles of similar size and shape and similar relative positions to each other during the ejection operation. For purposes of simplicity, the description of the apparatus 10 will be related to apparatus for ejecting rib sections from hog carcasses.

Referring to FIG. 1 and FIG. 3, a rib cutting or severing apparatus, generally 18, is located immediately upstream of the ejecting apparatus 10. The rib severing apparatus 18 separates the spare rib sections SR from the bellies B of hog carcass halves, the belly B remaining unsevered from the fat back portion FB thereof. As seen in FIG. 3, the loin sections have already been removed from the fat backs FB and the rib severing apparatus 18 has cut the spare ribs SR from the belly B, but the spare ribs SR remain in a rest position on top of the belly section B of the hog carcass half. The rib severing apparatus 18 may be of the type shown in U.S. Patent No. 3,546,737 or of the type shown in our copending U.S. Patent application Ser. No. 178,914 filed Sept. 9, 1971 and entitled "Rib Cutting Apparatus." The rib severing apparatus 18 forms no part of the present invention and no further description thereof will be provided herein.

A frame 20 is provided for supporting the conveyor section 12, the diverting section 14, and the severing apparatus 18. The receiving section 16 is self supported in between opposite diverting sections 14, as shown best in FIG. 2. The frame 20 includes a plurality of outer vertical supports 22 and a plurality of inner vertical supports 24 of a reduced height and spaced inwardly of the outer supports 22. The upper ends of the vertical supports 22 are interconnected by an overhead cross support 26 as shown in FIG. 1. Aligned longitudinal supports 28 rigidly interconnect the upper ends of the vertical supports 24 in a position substantially parallel to the center line of the conveyor sections 12. As shown in FIG. 1, the rib severing apparatus 18 is rigidly connected by suitable means to the overhead supports 26 and 28.

The conveyor section 12 includes an endless slot type conveyor 30, which is continuously driven by suitable drive means (not shown). The conveyor 30 is movably carried and supported along a horizontal elongated path of travel by an elongated conveyor frame section 32. The frame section 32 is supported in the desired vertical position for horizontal movement of the endless belt 30 by a plurality of horizontal cross bars 34 which are rigidly connected to and pass between spaced pairs of the vertical supports 22 and 24, as best shown in FIG. 2. As shown in FIG. 3, the frame section 32 has upper side corner flanges 36 and the endless conveyor 30 is located substantially flush with the upper portion of the flanges 36 and in close proximity thereto. Any suitable drive means (not shown) may be used for moving the endless conveyor 30 along its horizontal path of travel and at the desired rate of speed.

The diverting section 14, as best shown in FIG. 3, includes an operating portion 38, and a drive portion 40. The operating portion 38, includes a frame portion 42, which is pivotally mounted to a bracket 44, which, in turn, is rigidly inter-connected to one of the over head cross supports 26. The frame section 42 includes a tubular upper portion 46, through which a pin member 48 passes. The opposite ends of the pin 48 are received in downturned wings 50 and are secured therein by any suitable means. The frame 42 further includes a normally downwardly and outwardly angled central frame section 52, which is rigidly connected to the central portion of a horizontal support member 54 as seen in FIG. 4. A plurality of tubular housings 56 are rigidly secured at their central portions to the horizontal support section 54. The tubular housings extend angularly inwardly and downwardly and are positioned inwardly relative to the conveyor section 12. The central axis of the central frame section 52, and the central axis of the tubular housing 56 preferably form an angle between 90° and 180° as about 140°.

As shown best in FIG. 5, each tubular housing 56 carries a lower projecting rod 58 therein. Each rod 58 includes a transverse pin 60 with outwardly projecting outer ends which ride in spaced slots 62, which are parallel with the axis of each housing 56. The pin 60 thereby cooperates with the slots 62 to maintain the rod 58 within the tubular housing 56 for reciprocal, substantially upright movement therein. The rods 58 are each normally biased in a downward direction by a compression spring 64 which is received in the hollow upper end portions of each of the housings 56. The springs 64 bear against the upper ends of the rods 58 and against the lower faces of caps 66 which threadably engage and enclose the open upper ends of the tubular housings 56 so as to maintain the springs 64 under compression therein.

As shown in FIG. 3, the springs 64 normally bias the rods 58 to a position at which the projecting end of each pin 60 engages the lower end of each of the slots 62. The biased rods permit firm, yet yielding engagement with the hog carcass and with the ribs.

The lower ends of each of the rods 58 include rib engaging sections 68. Each rib engaging section 68 includes a plow portion 70 having an upwardly tapered end portion 72 for permitting non-interfering reception of a hog carcass as it slides underneath. The plows 70 are positioned substantially parallel to the path of travel of the conveyor section 12. Each rib engaging section 68 further includes inwardly directed deflector portions 74. These deflector portions 74 assure that the ribs SR will not pivot excessively about their lateral edges, which could result in the ribs being ejected improperly to the receiving section 16. As shown in FIG. 3, the rib engaging sections 68, in the operative position, are positioned directly opposite and laterally outwardly of the rib sections SR as the hog carcasses are carried along their path of travel by the conveyor section 12. The rib engaging sections 68, are positioned just above the fat back section FB of the hog carcass, and they are constructed and arranged to strike the lateral edge of the spare ribs SR with sufficient impact to forcibly eject them to the receiving section 16.

The drive portion 40 of the diverting section 14 includes a double acting air cylinder 76. A bracket 78 is rigidly mounted to the same over head cross support 26 which carries the bracket 44 that is used to carry the operating portion 38. The cylinder end of the air cylinder 76 is pivotally carried, at 80, by the bracket 78. The outer end of the air cylinder rod 82 is pivotally interconnected to the central portion of the central frame section 52 of the operating portion 38 of the diverting section 14. The double acting air cylinder 76 is connected to a suitable air pressure supply by suitable air line connections (not shown).

In order to assure that the drive portion 40 of the diverting section 14 operates to eject or divert spare ribs SR only at the appropriate time, that is, just when the ribs SR are opposite the diverting section 14, a limit switch 84 is mounted at the appropriate position relative to the operating section 38 to detect the leading edge of the hog carcass, specifically the leading edge of the fat back FB, whereby there is assurance that the spare ribs SR are precisely opposite the rib engaging sections 68 of the operating portion 38, in order that the edges thereof properly engage the edges of the spare ribs SR. The limit switch 84 is mounted on a bracket 86 which is fixedly secured to the outer elongated flange 36 of the frame section 32. The bracket 86 is constructed so as to have an inwardly open portion adjacent the conveyor 12 so as to permit the outer edge of the fat back FB to pass therethrough. The limit switch 84 is mounted to the upper portion of the bracket 86, and includes a pivoted downwardly extending arm 88. In the vertical downward position, the arm 88 is inactive. When the leading edge of the moving hog carcass pivots the arm 88 in an upward direction, the limit switch 84 is activated. By suitable means, as by electrical activation of a solenoid valve (not shown), pressurized air enters the cylinder 76 to move the rod 82 inwardly from the solid line position shown in FIG. 3 to the dotted line shown in FIG. 3.

The longitudinal location of the limit switch 84 and the arm 88 relative to the position of the diverting section 14 is quite important in order to assure that the ribs SR are properly ejected at the proper time. Also, the rib ejection takes place during the continuous longitudinal movement of the carcass and the spare ribs SR along the conveyor 12. Therefore, the spare ribs SR and carcasses are moving longitudinally as the diverting section 14 operates transversely to engage and eject or kick off the rib section SR.

The rib ejecting section 14 is designed to engage the outer, cut edge of the ribs and is designed to avoid striking the hog carcass itself. Although the diverting section is so designed and the weight of the carcass should remain transversely stationary, it is preferred that a holding device, generally 90, be provided to assure that the carcass remains in a substantially uniform transverse position during the ejection operation. The holding section 90 includes an elongated narrow, downwardly facing bar 92 which is substantially parallel to the path of travel of the conveyor section 12 and of the hog carcass being carried thereby. The bar 92 is secured at its opposite ends to a pair of upright rods 94 which are reciprocally received within a pair of longitudinally spaced housings 96. The housings 96 are constructed substantially in the same manner as the tubular housings 56 of the operating diverting section 38. Thus, the housings 96 each are enclosed at their upper ends by caps 66. Biasing springs, like the spring 64, are contained therein for normally biasing the bar 92 in a downward direction for positive engagement with the fat back portion FB of the hog carcass, the fat back FB extending laterally outwardly of the belly B and spare ribs SR, as shown in FIG. 3.

Referring to FIGS. 2 and 3, the upright housings 96 are rigidly secured to a longitudinal support bar 98 which, in turn, is secured to a bracket 100 which is fixed to one of the outer vertical upright supports 22. The leading end of the bar 92 is tapered upwardly so as to assure longitudinal reception of the fat back FB therebelow. Preferably, the lower edge of the bar 92 is tapered so as to assure positive engagement with the fat back FB while avoiding any adverse affect thereon. The holding section 90 is thus preferred to assure uniform lateral position of the hog carcass on the conveyor during ejection of the ribs therefrom, while permitting longitudinal movement of the carcass. This uniform lateral position is particularly important in the event that a circular saw (not shown) or other such severing means is mounted downstream of the conveyor section 12 for severing the fat back FB from the belly portion B.

Referring now to FIGS. 2, 6, and 7, the receiving section 16 includes a longitudinally elongated hopper section 102 which has a plurality of legs 104 provided thereon. As indicated earlier, the receiving section 16 is positioned between the diverting sections 14 so that a single receiving section 16 is used for a pair of diverting sections.

In order to avoid interference in the hopper 102 between the spare ribs SR being ejected from the opposite diverting sections into the receiving section 16, a gating device 106 is mounted longitudinally along the central portion of the open upper end of the hopper 102. The gating device 106 is mounted, at its opposite ends to the opposite end walls of the hopper 102. A pair of substantially upright rib deflectors 108 are rigidly mounted along the central longitudinal section of the hopper 102 for directing ejected ribs downwardly into the hopper 102, one deflector 108 being provided for each of the diverting sections 14. A plurality of aligned fingers 110 normally enclose the open upper portion of the hopper 102 in the area between each deflector 108 and the lateral side walls of the hopper 102. The arms 110 are fixedly secured at their inner ends to the rigid pivot bar 112. A pair of counter weights 130 are fixed to the opposite ends of the pivot bar 112 in order to normally pivot the pivot bar 112 and the fingers 110 to substantially horizontal, closed position for preventing the passage of ribs SR downwardly into the hopper. A fixed stop 114 is rigidly mounted on the hopper 102 for engaging an arm 116 fixed to the pivot bar 112 so as to locate the aligned fingers 110 in the desired closed position.

In order to permit only one rib section at a time to pass downwardly into the hopper 102, a sequencing device 118 is provided. The sequencing device 118 includes a horizontally slidable bar 120 having rollers 122 at the outer ends. The bar 120 is slidably mounted on brackets 124 which are secured to the outside end wall of the hopper 102. The rollers 122 each normally engage a pair of wheels 126 which are coaxially mounted with the pivot bar 112, a detent position 128 being provided in each of the wheels 126. The length of the sliding bar 120 is such that the roller on one side may engage the detent 128 of one of the wheels 126, while the other roller engages the peripheral outer surface of the other wheel 126. In this way, one of the pivot bars 112 is free to be pivoted downwardly for permitting a rib section SR to pass into the hopper 102 while the other roller 122 in the other detent 128 locks the other pivot bar in the closed position. Thus, after one rib section SR passes downwardly into the hopper 102, the counterweight 130 pivots the pivot bar 112 back to the closed position and the weight of another rib in the other set of gating fingers 110 causes the other roller to move out of the detent 128 and permits the other rib in the other gating section to drop downwardly into the hopper. Thus, one rib at a time is passed into the hopper from opposite sides.

Although it is believed that the operation of the described device should be apparent from the foregoing, a description of the operation will be provided in order to have a more full understanding of the invention. Following, removal of a loin, and after severing of the spare ribs SR from the belly portion B of a hog carcass by the rib severing apparatus 18, the hog carcass, including the belly B and fat back FB in an unsevered condition, with the spare ribs SR resting on top of the belly portion B is moved toward the rib ejecting apparatus 10. The conveyor section 12 moves the hog carcasses continuously and successively in a longitudinal path of travel, the left half and right half sides moving on opposite conveyors. As the carcass moves along its path of travel by the rib ejector, nothing occurs until the leading edge of the fat back FB engages the downwardly extending arm 88 of the limit switch 84. This pivots the limit switch arm 88 upwardly activating a solenoid (not shown) causing pressurized air to enter the air cylinder 76 for moving the cylinder from the full line position shown in FIG. 3 to the dotted line position shown in FIG. 3.

During this movement of the air cylinder 76, the spare ribs SR are substantially opposite the rib engaging sections 68 of the operating portions 38 of the diverting section 14. Also, the holding bar 92 is in sliding engagement with the upper surface of the fat back FB for holding the hog carcass in a fixed transverse position on the conveyor section 12. As the air cylinder 76 activates the operating portion 38, the rib engaging sections 68 engages the outer or severed lateral edge of the rib section SR as it is being moved by the conveyor in a longitudinal path of travel. The ribs SR are forcibly driven from the belly portion B, in the manner shown in FIG. 3, by the operating portion 38 striking the deflector 108 of the gating device 106 mounted on the hopper 102. The limit switch remains activated only as long as the limit switch engages the upper surface of the fat back FB. As it returns to its normal position, the double acting air cylinder is activated to move the air cylinder 76 in the opposite direction, that is, from the dotted line position shown in FIG. 3 to the full line position therein, and into position for ejecting the next rib section SR.

At the receiving section, the ejected rib does not drop into the hopper until such time as the respective roller 122 in the sliding bar 120 moves into position in the detent portion 128 to permit the adjacent roller 122 to move out of the adjacent detent 128 permitting the spare rib SR to drop into the hopper 102.

While in the foregoing, there has been provided a detailed description of a particular embodiment of the present invention, it is to be understood that all equivalents obvious to those having skill in the art are to be included within the scope of the invention as claimed.

What we claim and desire to secure by Letters Patent Is:

1. An apparatus for diverting each of successive substantially flat articles from a substantially horizontal path of travel, wherein said substantially flat articles are each detachably resting on each of a series of other articles which are also moving along said path of travel, said apparatus comprising, in combination, a frame, means on said frame for continuously moving said articles in said relative position along said path of travel, said other articles resting on top of said moving means and each of substantially flat articles resting on each of said other articles, means on said frame for diverting each of said substantially flat articles only from on top of said articles in a direction transverse of said path of travel, said diverting means normally being mounted laterally of said substantially flat articles, drive means operatively connected to said diverting means, means for activating said drive means only when said substantially flat articles are positioned opposite said diverting means, said other articles remaining in a fixed transverse position relative to the longitudinal path of travel of said carrying means as said diverting means engage the lateral edge portion of each of said substantially flat articles only to divert said substantially flat articles in a transverse direction from said path of travel, and means for substantially preventing said substantially flat articles from pivoting about their lateral edges beyond approximately 90° from the original position.

2. An apparatus for diverting each of successive substantially flat articles from a substantially horizontal path of travel, wherein said substantially flat articles are each detachably resting on each of a series of other articles which are also moving along said path of travel, said apparatus comprising, in combination, a frame, means on said frame for continuously moving said articles in said relative position along said path of travel, said other articles resting on top of said moving means and each of substantially flat articles resting on each of said other articles, means on said frame for diverting each of said substantially flat articles only from on top of said articles in a direction transverse of said path of travel, said diverting means normally being mounted laterally of said substantially flat articles and including means for engaging lateral edge portions of said substantially flat articles for diverting said substantially flat articles only without movably engaging said other articles whereby said other articles remain in a substantially fixed position on said moving means, drive means operatively connected to said diverting means, and means for activating said drive means only when said substantially flat articles are positioned opposite diverting means, said other articles remaining in a fixed transverse position relative to the longitudinal path of travel of said carrying means as said engaging means engage the lateral edge portionof each of said substantially flat articles only to divert said substantially flat articles in a transverse direction from said path of travel.

3. The apparatus of claim 1 including means for positively holding said other articles in a substantially fixed transverse position on said moving means as said substantially flat articles are being diverted.

4. The apparatus of claim 1 including means for receiving said diverted articles.

5. The apparatus of claim 1 wherein said diverting means are normally positioned above a portion of said other articles, and in the operative position, are positioned laterally of said substantially flat articles for forcibly driving substantially flat articles from said other articles upon being operated by said activated driving means.

6. The apparatus of claim 1 wherein said activating means comprises limit switch means which is activated as the leading edge of said other articles engages said switch means, thereby assuring that said articles are positioned laterally and opposite of said diverting means.

7. The apparatus of claim 1 wherein said articles comprise spare ribs and said other articles comprise unsevered hog bellies and fat backs of hog carcasses, said spare ribs being located above said belly portions.

8. The apparatus of claim 1 wherein said holding means comprises an elongated bar positioned parallel to the longitudinal path of travel of said other articles and engaging a portion of said other articles so as to hold said other articles in a fixed transverse position as said substantially flat articles are be diverted.

9. The apparatus of claim 8 wherein said elongated bar has an upwardly tapered leading edge for receiving the leading edge of said other articles therebelow, said bar also having a tapered lower edge for positively engaging said other articles.

10. An apparatus for diverting each of successive substantially flat articles from a substantially horizontal path of travel, wherein said substantially flat articles are each detachably resting on each of a series of other articles which are also moving along said path of travel, said apparatus comprising, in combination, a frame, means on said frame for continuously moving said articles in said relative position along said path of travel, said other articles resting on top of said moving means and each of substantially flat articles resting on each of said other articles, a pair of means on said frame for diverting each of said substantially flat articles only from on top of said articles in a direction transverse of said path of travel, said diverting means normally being mounted laterally of said substantially flat articles, drive means operatively connected to said diverting means, means for activating said drive means only when said substantially flat articles are positioned opposite said diverting means, said other articles remaining in a fixed transverse position relative to the longitudinal path of travel of said carrying means as said diverting means engage the lateral edge portion of each of said substantially flat articles only to divert said substantially flat artaicles in a transverse direction from said path of travel, and means positioned between each of said diverting means for receiving said diverted articles from opposite sides.

11. The apparatus of claim 10 including means for admitting only one substantially flat article at a time to said receiving means.

12. The apparatus of claim 11 wherein said admitting means includes a pair of pivoting gate means mounted on each side of said receiving means for receiving said diverted articles, one of said gate means being operative while the other of said gate means is inoperative.

13. The apparatus of claim 10 including upright deflector means on said receiving means to deflect each of said diverted articles downwardly to said receiving means.

* * * * *